(12) United States Patent
Ozturk et al.

(10) Patent No.: US 12,425,928 B2
(45) Date of Patent: Sep. 23, 2025

(54) MAINTAINING CONFIGURATIONS IN CONDITIONAL PRIMARY SECONDARY CELL GROUP CHANGE

(71) Applicant: QUALCOMM Incorporated, San Diego, CA (US)

(72) Inventors: Ozcan Ozturk, San Diego, CA (US); Gavin Bernard Horn, La Jolla, CA (US); Punyaslok Purkayastha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 801 days.

(21) Appl. No.: 17/696,730

(22) Filed: Mar. 16, 2022

(65) Prior Publication Data
US 2023/0300683 A1   Sep. 21, 2023

(51) Int. Cl.
*H04W 36/00* (2009.01)
(52) U.S. Cl.
CPC ... *H04W 36/0016* (2013.01); *H04W 36/0058* (2018.08)

(58) Field of Classification Search
CPC ......... H04W 36/0016; H04W 36/0058; H04W 36/0085; H04W 36/362; H04W 36/0069
See application file for complete search history.

(56) References Cited

U.S. PATENT DOCUMENTS

| 2023/0007550 A1* | 1/2023 | Kumar | H04W 36/00692 |
| 2023/0007552 A1* | 1/2023 | Sun | H04W 36/00835 |
| 2023/0300691 A1* | 9/2023 | Eklöf | H04W 36/0061 370/331 |
| 2023/0413153 A1* | 12/2023 | Zhang | H04W 36/362 |
| 2024/0073771 A1* | 2/2024 | Wu | H04W 36/0079 |

* cited by examiner

*Primary Examiner* — Abdullahi Ahmed
(74) *Attorney, Agent, or Firm* — Holland & Hart LLP

(57) ABSTRACT

Methods, systems, and devices for wireless communications are described. The method includes a user equipment (UE) receiving signaling from a network entity that indicates a set of multiple node configurations for a set of multiple target nodes, receiving a command from the network entity to perform a node update procedure associated with the set of multiple node configurations, performing the node update procedure based on receiving the command, maintaining at least one of the set of multiple node configurations after performing the node update procedure, and communicating based on results of the node update procedure.

26 Claims, 14 Drawing Sheets

MAINTAINING CONFIGURATIONS IN CONDITIONAL PRIMARY SECONDARY CELL GROUP CHANGE

FIELD OF TECHNOLOGY

The following relates to wireless communications, including maintaining configurations in conditional primary secondary cell group change.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequently division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support maintaining configurations in conditional primary secondary cell group change. For example, the described techniques provide for a user equipment (UE) receiving one or more node configurations for multiple target nodes. The UE may perform one or more cell measurements (e.g., of target nodes, source nodes, etc.) and transmit the results of the cell measurements to a network entity. Based on an analysis of the one or more cell measurements, the UE may receive a command to initiate a node update procedure. The UE may perform the node update procedure based on receiving the command. After performing the node update procedure, the UE may maintain at least one of the one or more node configurations that the UE received from the network entity. The UE may then communicate based on the node update procedure and at least one of the multiple node configurations being maintained after performing the node update procedure.

The described techniques also provide for a network entity (e.g., source master node, source secondary node) transmitting one or more node configurations for multiple target nodes to the UE. The network entity may receive the results of cell measurements from the UE. Based on an analysis of the one or more cell measurements, the network entity may transmit to the UE a command to initiate a node update procedure. The configuration may indicate that the UE is to maintain at least one of the one or more node configurations after performing the node update procedure. The network entity may then communicate based on the node update procedure and at least one of the multiple node configurations being maintained after the node update procedure is performed.

DETAILED DESCRIPTION

Figure 1:
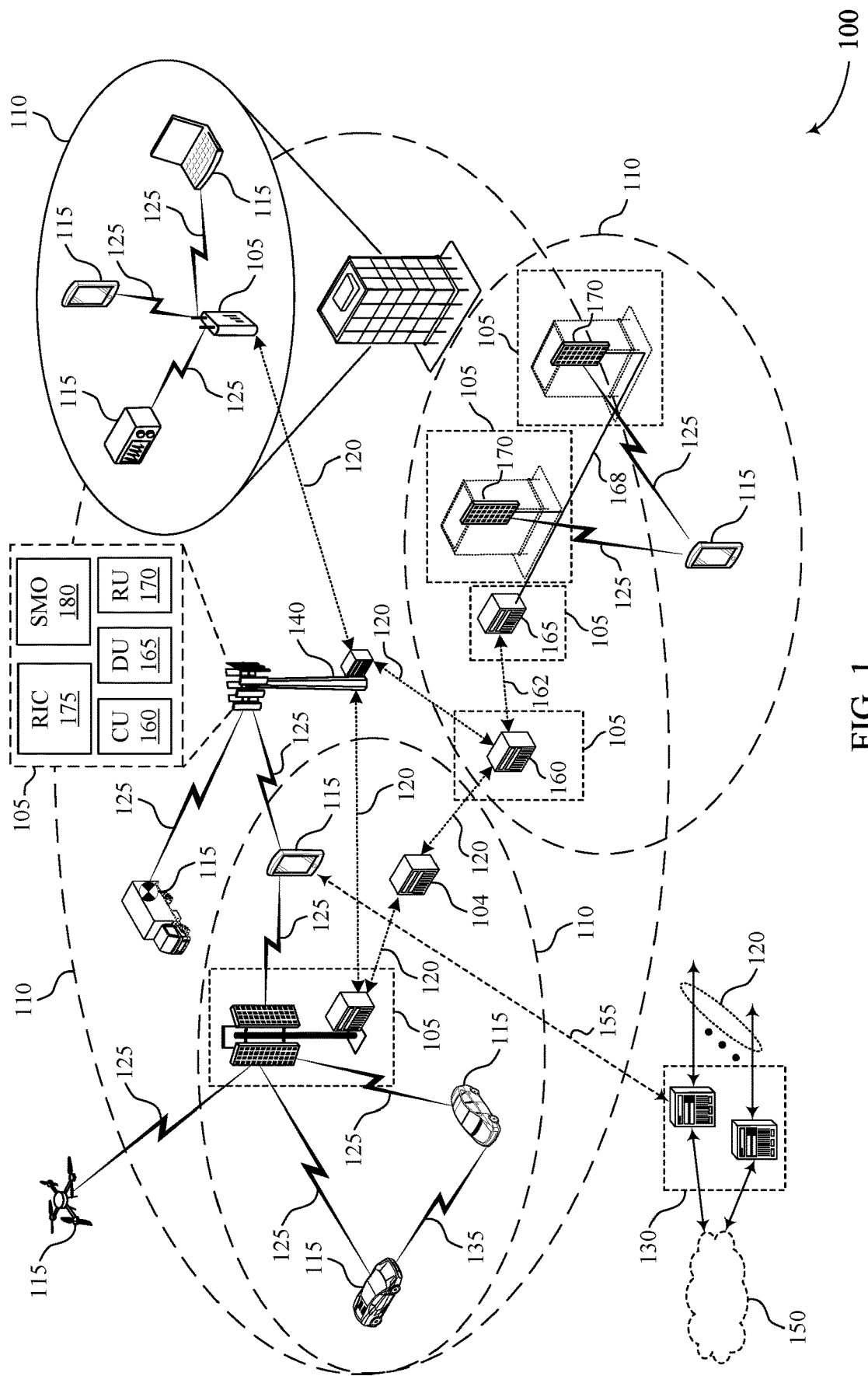
FIG. 1 illustrates an example of a wireless communications system that supports maintaining configurations in conditional primary secondary cell group change in accordance with one or more aspects of the present disclosure.

Some user equipment (UE) may support dual connectivity in which the UE has concurrent connections with multiple nodes in a wireless communications system. For example, the UE may have a connection with a master node (MN) via one or more serving cells and may simultaneously have a connection with a secondary node (SN) via one or more serving cells. The MN may be associated with one or more serving cells that make up a master cell group (MCG). For example, the MN may be associated with a primary cell (PCell), which may be used for initial access and other types of procedures, and optionally, one or more secondary cells (SCells). The SN may also be associated with one or more serving cells that make up a secondary cell group (SCG). For example, the SN may be associated with a primary secondary cell (PSCell), which may be used for initial access and other types of procedure, and optionally one or more SCells. In some examples, the MN may provide a control plane connection to a core network and the SN may provide additional resources to the UE.

In some wireless communications systems, the UE may add or change a serving cell, such as the PSCell. For example, a UE may use a conditional PSCell procedure to add a PSCell or to change a PSCell (e.g., a conditional PSCell addition (CPA) procedure, a conditional PSCell change (CPC) procedure). CPA may be used to add an SN to enable DC. CPC may be used for changing from a source SN to a target SN. Collectively CPA and CPC procedures may be referred to as conditional PSCell addition change (CPAC) procedures). For example, CPAC procedures may be used to provide SCG configurations (and associated MCG configurations), including resource configurations, and execution conditions for multiple target PSCells.

Aspects of CPAC may be applied to handover procedures. Conditional handover (CHO) may be based on a network entity configuring a UE with multiple target cells as handover targets, thus preparing the UE for a handover based on the network entity sending the UE a handover trigger. CHO avoids the UE sending a measurement report to the MN and waiting for a handover command, making handover more robust when cell conditions degrade in a relatively rapid fashion.

A drawback of CPAC and CHO is that the UE releases configurations (e.g., all CPAC configurations or all CHO configurations, or both) once the UE performs SN addition or change, or CHO. Thereafter, the MN configures the UE again for the next SN or MN change with new target PSCell(s) or target PCell(s) and new measurement triggers.

The described techniques avoid releasing associated configurations (e.g., all CPAC configurations or all CHO configurations, or both) once the UE performs SN addition or change, or CHO. The described techniques include the MN or SN, or both, providing one or more node configurations, enabling conditional SN add/change or CHO being performed based on an execution command from the MN or source SN. In some cases, the source MN or source SN may provide a UE with one or more node configurations for node addition/change (e.g., secondary node addition/change, master node handover, etc.). The one or more node configurations may include a configuration for a target SN, a source SN (e.g., an update of a source SN configuration), a target MN, a source MN (e.g., an update of a source MN configuration), a target SCG, a target MCG, a source SCG, or a source MCG, or a combination thereof.

The source MN or source SN may omit triggering conditions from the one or more node configurations. For example, the one or more node configurations transmitted to the UE may include a configuration for a node without any corresponding trigger conditions for that node. Instead, the execution for a node addition/change may be sent by the source MN or source SN, in the form of either a reduced handover command (e.g., RRC without target configuration), or as layer 1 (L1) or layer 2 (L2) signaling, which may include downlink control information (DCI) or medium access control (MAC) control element (MAC-CE), or both. In some cases, the handover command may provide an updated configuration for MN, source SN, and/or current or new target SNs. Thus, the described techniques may include node addition/change being triggered dynamically by a network entity, the UE receiving multiple node configurations and maintaining one or more of the configurations after a node addition/change, or automatic measurement triggers being omitted from the node configurations, or a combination thereof.

Aspects of the subject matter described herein may be implemented to realize one or more advantages. The described techniques may support improvements in system efficiency such that a device may avoid sending a measurement report to the MN and waiting for a CPAC or CHO command, making CPAC and CHO more robust when cell conditions degrade in a relatively rapid fashion. Additionally, described techniques may result in avoiding multiple retransmissions and failed transmissions, decreasing system latency, improving the reliability of a decoding procedure for uplink transmissions at a network entity, and improving user experience.

Aspects of the disclosure are initially described in the context of wireless communications systems. Aspects of the disclosure are further illustrated by and described with reference to process flows that relate to maintaining configurations in conditional cell group additions and changes. Aspects of the disclosure are further illustrated by and described with reference to apparatus diagrams, system diagrams, and flowcharts that relate to maintaining configurations in conditional cell group additions and changes.

FIG. 1 illustrates an example of a wireless communications system 100 that supports maintaining configurations in conditional primary secondary cell group change in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support maintaining configurations in conditional primary secondary cell group change as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

In some examples, a network entity 105 may transmit one or more node configurations for multiple target nodes to a UE 115. The UE 115 may perform one or more cell measurements (e.g., of target nodes, source nodes, etc.) and transmit the results of the cell measurements to the network entity 105. Based on an analysis of the one or more cell measurements, the network entity 105 may transmit to the UE 115 a command to initiate a node update procedure. The UE 115 may perform the node update procedure based on receiving the command. After performing the node update procedure, the UE 115 may maintain at least one of the one or more node configurations that the UE 115 received from the network entity 105. The UE 115 may then communicate based on the node update procedure and at least one of the multiple node configurations being maintained after performing the node update procedure.

Figure 2:
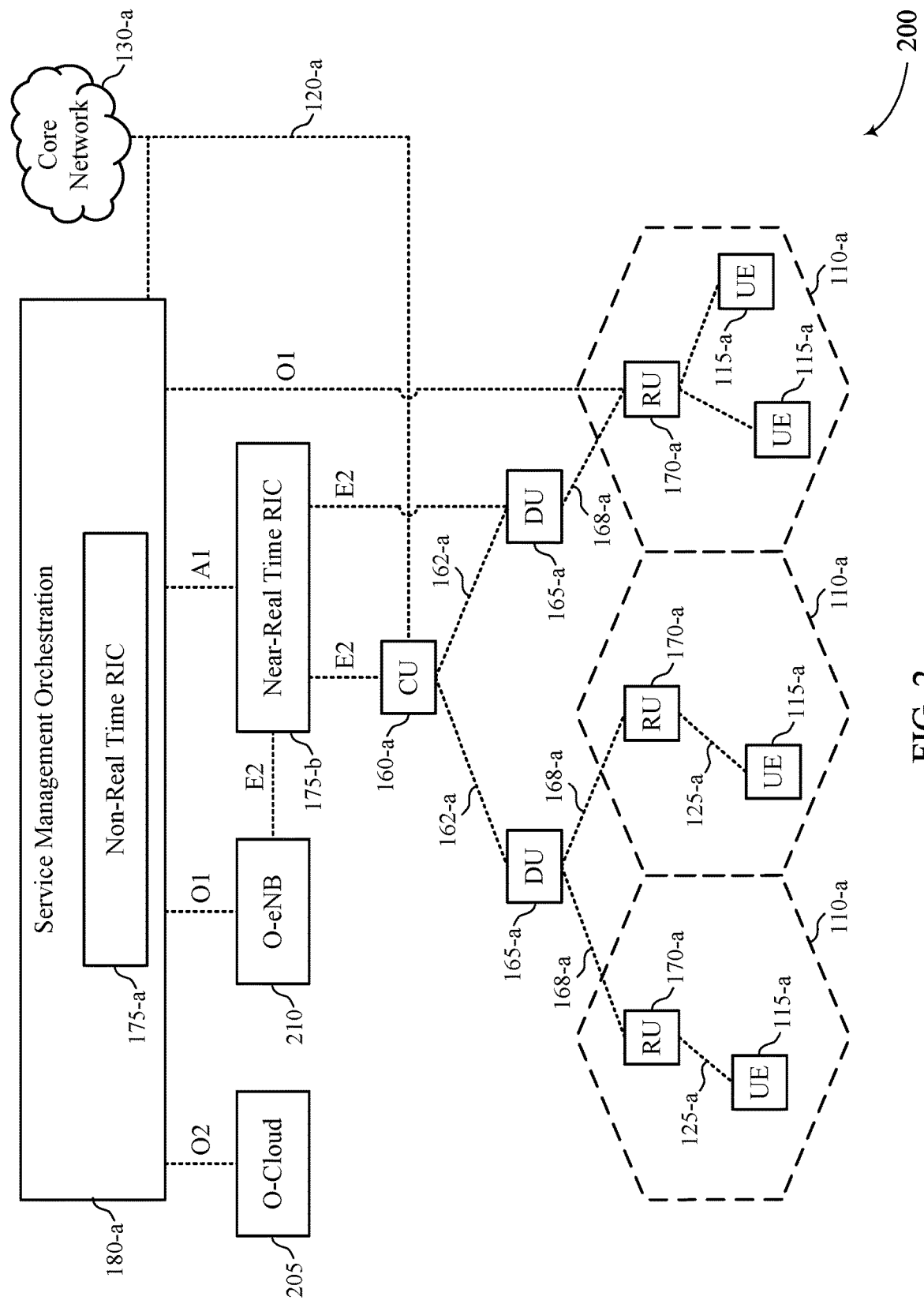
FIG. 2 illustrates an example of a wireless communications system that supports maintaining configurations in conditional primary secondary cell group change in accordance with one or more aspects of the present disclosure.

FIG. 2 illustrates an example of a network architecture 200 (e.g., a disaggregated base station architecture, a disaggregated RAN architecture) that supports maintaining configurations in conditional primary secondary cell group change in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may communicate with respective UEs 115-*a* via one or more communication links 125-*a*. In some implementations, a UE 115-*a* may be simultaneously served by multiple RUs 170-*a*. The respective RUs 170-*a* and UEs 115-*a* may be in respective coverage areas 110-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g. via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via 01) or via generation of RAN management policies (e.g., A1 policies).

Figure 3:
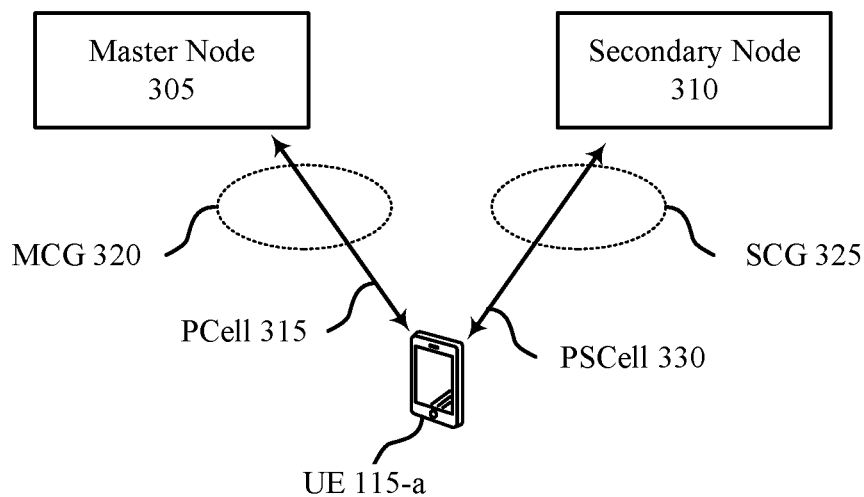
FIG. 3 illustrates an example of a wireless communications system that supports maintaining configurations in conditional primary secondary cell group change in accordance with one or more aspects of the present disclosure.

FIG. 3 illustrates an example of a wireless communications system 300 that supports maintaining configurations in conditional primary secondary cell group change in accordance with one or more aspects of the present disclosure. In some examples, some aspects of wireless communications system 300 may implement or be implemented by aspects of wireless communications system 100. For example, wireless communications system 300 may include a master node 305, a secondary node 310, and a UE 115-*a*. The node 305 and node 310 may be examples of radio access nodes, such as network entities, eNBs, gNBs, network entities, and the like, such as described with reference to FIG. 1. The UE 115-*a* may be an example of a UE 115 described with reference to FIG. 1. The wireless communications system 300 may support the use of maintained configurations for conditional PSCell procedures or conditional handovers, or both, performed by the UE 115-*a*.

The UE 115-*a* may support dual connectivity in which the UE 115-*a* has concurrent connections with node 305 and node 310. For example, the UE 115-*a* may have a connection with the master node 305 via one or more serving cells and may simultaneously have a connection with the secondary node 310 via one or more serving cells. In some cases, the master node 305 and the secondary node 310 operate using the same radio access technology (RAT). In other examples, the master node 305 and the secondary node 310 may operate using different RATs (e.g., the master node 305 may operate using a first RAT and the secondary node 310 may operate using a second, different RAT). The UE 115-*a* may likewise support multi-RAT dual connectivity (MR-DC) in which node 305 and node 310 operate using different RATs.

The master node 305 may be associated with one or more serving cells that make up the MCG 320. For example, the master node 305 may be associated with a PCell 315, which may be used for initial access and other types of procedures, and optionally one or more SCells in addition to PCell 315. The secondary node 310 may also be associated with one or more serving cells that make up the SCG 325. For example, the secondary node 310 may be associated with a PSCell 330, which may be used for initial access and other types of procedures, and optionally one or more SCells in addition to PSCell 330. In some examples, the master node 305 may provide a control plane connection to the core network and the secondary node 310 may provide additional resources to the UE 115-*a*.

The master node 305 may send the UE 115-*a* one or more configurations for a conditional PSCell procedure (e.g., a CPA procedure, a CPC procedure) for adding a PSCell or changing the PSCell 330. The one or more configurations may be sent before communication conditions degrade (e.g., at the PSCell 330 or PCell 315). In some examples, the master node 305 may send the UE 115-*a* one or more configurations for a handover procedure for handing over (e.g., changing) the PCell (e.g., from a source master node to a target master node). For example, the master node 305 may transmit a configuration for a conditional handover procedure (CHO) that is triggered by a command from the master node 305 or secondary node 310.

In some examples, the master node 305 or secondary node 310 may transmit one or more node configurations for one or more target nodes to UE 115-*a*. In some cases, the master node 305 or secondary node 310, or both, may omit trigger conditions for cell measurements from the one or more node configurations. In some cases, the one or more node configurations include one or more of a target master node configuration, a source master node configuration, a target secondary node configuration, a source secondary node configuration, one or more candidate master node configurations, one or more candidate secondary node configurations, or an update to an existing node configuration, or a combination thereof. In some cases, the one or more node configurations are received in a radio resource control message.

In some examples, the UE 115-*a* may perform one or more cell measurements (e.g., of target nodes, source nodes, etc.) and transmit the results of the cell measurements to the master node 305 or secondary node 310, or both, after receiving the one or more node configurations (e.g., independent of any trigger condition for cell measurements). Based on an analysis of the one or more cell measurements, the master node 305 or secondary node 310 may transmit to the UE 115-*a* a command to initiate a node update procedure. The UE 115-*a* may perform the node update procedure based on receiving the command. After performing the node update procedure, the UE 115-*a* may maintain at least one of the one or more node configurations that the UE 115-*a* received from the master node 305 or secondary node 310. The UE 115-*a* may then communicate based on the node update procedure and at least one of the multiple node configurations being maintained after performing the node update procedure.

In some examples, the master node 305 or secondary node 310, or both, transmitting the command to the UE 115-*a* to perform the node update procedure may be based on the cell measurements that the master node 305 or secondary node 310, or both, receive from the UE 115-*a*. In some cases, the UE 115-*a* may release at least one node configuration of the received one or more node configurations based on the master node 305 or secondary node 310 including a release indication in the command that indicates which node configurations are being released.

In some examples, the UE 115-*a* may receive one or more node configurations in the command. The one or more node configurations included in the command may include a source master node configuration, a target master node configuration, an update to an existing master node configuration (e.g., existing source master node configuration, existing target master node configuration), a source secondary node configuration, a target secondary node configuration, or an update to an existing secondary node configuration (e.g., existing source secondary node configuration, existing target secondary node configuration).

The master node 305 or secondary node 310, or both, may transmit the command via downlink control information (DCI) or medium access control (MAC) control element (MAC-CE), or both. In some cases, the master node 305 or secondary node 310, or both, may transmit the command via radio resource control (RRC). In some cases, when the command is transmitted via DCI or MAC-CE, the DCI or MAC-CE, or both, may include a target cell group identifier associated with a master cell group or a secondary cell group.

In some examples, the node update procedure may include the UE 115-a changing from a source node to a target node, where the source node includes a source master node and the target node includes a target master node, or the source node includes a source secondary node and the target node includes a target secondary node. In some cases, the node update procedure may include the UE 115-a changing from a source master node to a target master node, and changing from a source secondary node to a target secondary node.

In some examples, the node update procedure includes the UE 115-a changing from a first cell to a second cell. In some cases, the first cell includes a source serving cell associated with a master cell group and the second cell includes a target cell associated with the master cell group, or the first cell includes a source serving cell associated with a secondary cell group and the second cell includes a target cell associated with the secondary cell group, or both.

In some examples, the node update procedure includes the UE 115-a adding a second link to a secondary node or adding a second link to a master node, or both, while maintaining a first link to the master node in accordance with a dual connectivity mode of the UE 115-a.

The techniques described herein may reduce power consumption and free up processing cycles of one or more devices (e.g., battery-operated devices, a UE 115 of FIG. 1, etc.) by triggering node additions/changes dynamically via master node 305 or secondary node 310, or both. System latency may be decreased, battery life extended, quality of service increased by the UE 115-a receiving one or more node configurations and maintaining at least one configuration of the received configurations after a node addition/change (e.g., CPA, CPC, CHO), and based on automatic measurement triggers for cell measurements being omitted from the node configurations, thus increasing user experience.

Figure 4:
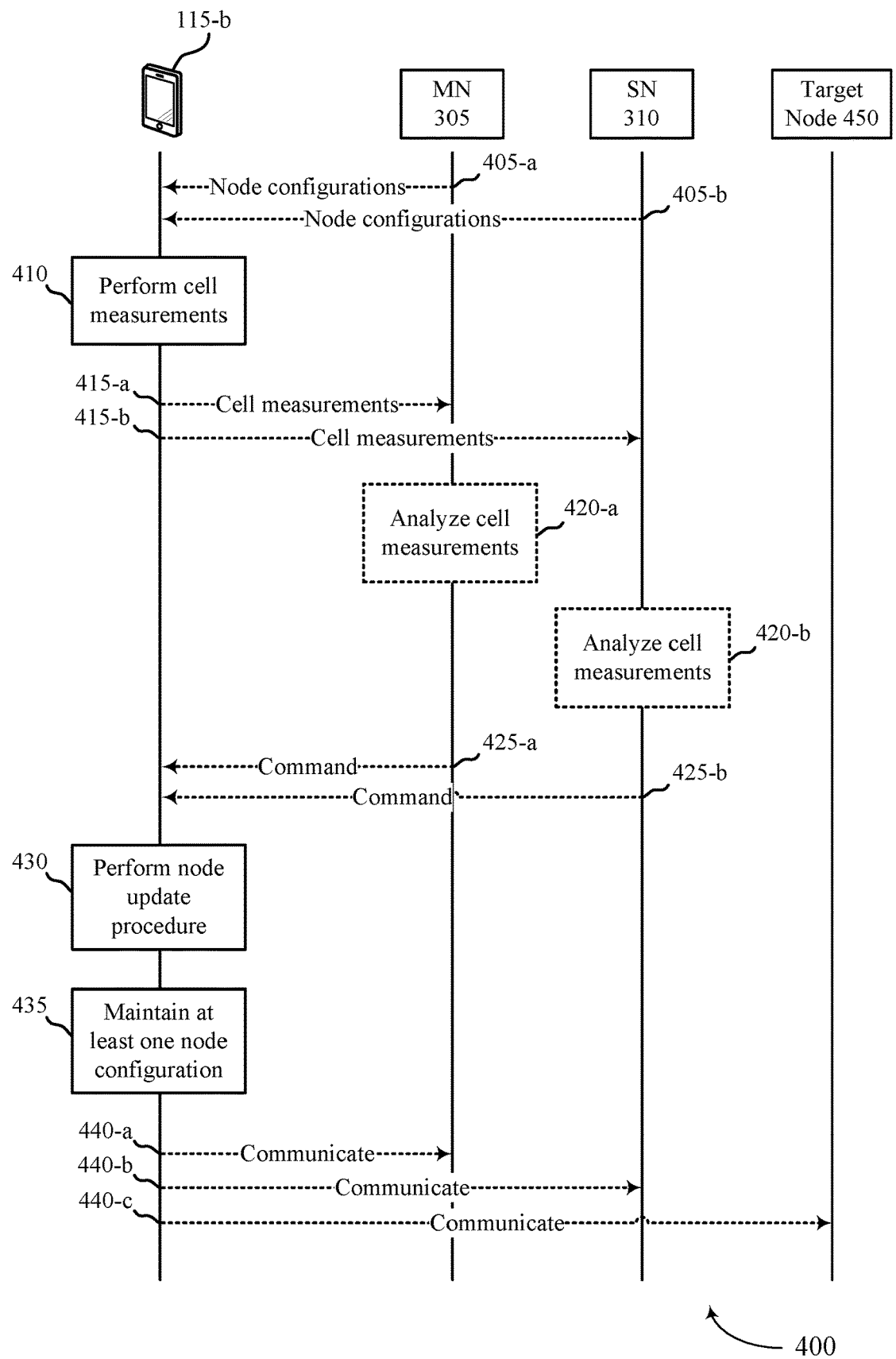
FIG. 4 illustrates an example of a process flow that supports maintaining configurations in conditional primary secondary cell group change in accordance with one or more aspects of the present disclosure.

FIG. 4 illustrates an example of a process flow 400 that supports maintaining configurations in conditional primary secondary cell group change in accordance with one or more aspects of the present disclosure. In some examples, some aspects of process flow 400 may implement or be implemented by aspects of wireless communications system 100. For example, process flow 400 may include a UE 115-b, which may be an example of a UE 115 described with reference to FIGS. 1 and 2, and include master node 305, secondary node 310, and target node 450, which may be examples of a network entity 105, master node 305, or secondary node 310 described with reference to FIGS. 1 and 2.

At 405 (e.g., 405-a, 405-b), master node 305 or secondary node 310, or both, may transmit one or more node configurations to UE 115-b. The one or more configurations may be associated with a node update procedure that includes conditional cell addition/change procedures (e.g., conditional PSCell addition (CPA), conditional PSCell change (CPC), or conditional handover (CHO), or a combination thereof). Based on the one or more node configurations, a source node (e.g., master node 305, secondary node 310) configures one or more target nodes (e.g. target node 450) as handover targets or one or more target cells as cell addition/change targets based on the cell measurements. Based on the one or more node configurations, the node update procedure may be performed by a combination of legacy and conditional cell addition/change procedures.

At 410, UE 115-b may perform one or more cell measurements. In some cases, UE 115-b may perform the one or more cell measurements based on the one or more node configurations received from master node 305 or secondary node 310, or both.

At 415 (e.g., 415-a, 415-b), UE 115-b may transmit results of the one or more cell measurements to master node 305 or secondary node 310, or both. In some cases, master node 305 or secondary node 310, or both, may configure measurement events for the target candidates (e.g., target node 450), configuring the UE 115-b to perform and report cell measurements based on a provided trigger.

At 420 (e.g., 420-a, 420-b), master node 305 or secondary node 310, or both, may analyze the results of the one or more cell measurements received from UE 115-b.

At 425 (e.g., 425-a, 425-b), master node 305 or secondary node 310, or both, may transmit a command to UE 115-b. Based on the one or more received node configurations, UE 115-b is not constrained to send a measurement report to a source node and wait for a handover command, making the node update procedure more robust for the cases when the source cell conditions degrade rapidly. In addition, the described techniques improve the handover latency by eliminating reporting and handover command reception. The command may include an updated configuration for master node 305, secondary node 310, or target node 450. In some cases, the command may include a new configuration for master node 305, secondary node 310, or target node 450. In some cases, the command may be transmitted via RRC, DCI, or MAC-CE, or a combination thereof.

At 430, UE 115-b may perform a node update procedure based on the command from master node 305 or secondary node 310, or both. In some cases, the node update procedure may include conditional cell addition/change procedures (e.g., conditional PSCell addition (CPA), conditional PSCell change (CPC), or conditional handover (CHO), or a combination thereof).

At 435, UE 115-b may maintain at least one node configuration of the one or more node configurations received from master node 305 or secondary node 310, or both. As indicated, master node 305 or secondary node 310, or both, may configure measurement events for the target candidates (e.g., target node 450), configuring the UE 115-b to report cell measurements based on an indicated trigger. In some cases, the UE 115-b may be provided with a trigger for cell measurement after the UE 115-b performs the node update procedure (e.g., provided by the master node or the primary secondary node after the node update procedure). Thus, prior to receiving node configurations at 405, UE 115-b may have received a trigger to perform the cell measurements at 415. In some cases, after performing the node update procedure and receiving the cell measurement triggers, the UE 115-b may perform a second cell measurement (in addition to and after a cell measurement at 415), and based on the maintained node configurations, UE 115-b may perform a second node update procedure.

In some examples, the master node 305 may be a source master node and the target node 450 may be the target master node. Thus, the node update procedure may include a conditional handover procedure where the target node 450 becomes the new master node. However, based on UE 115-b maintaining node configurations after the node update procedure, the configuration of the master node 305 may be added as a configuration of a target cell candidate upon completion of the handover.

At 440 (e.g., 440-a, 440-b, 440-c), UE 115-b may communicate with master node 305, secondary node 310, or target node 450, or with a combination thereof, based on the UE 115-b performing the node update procedure.

Figure 5:
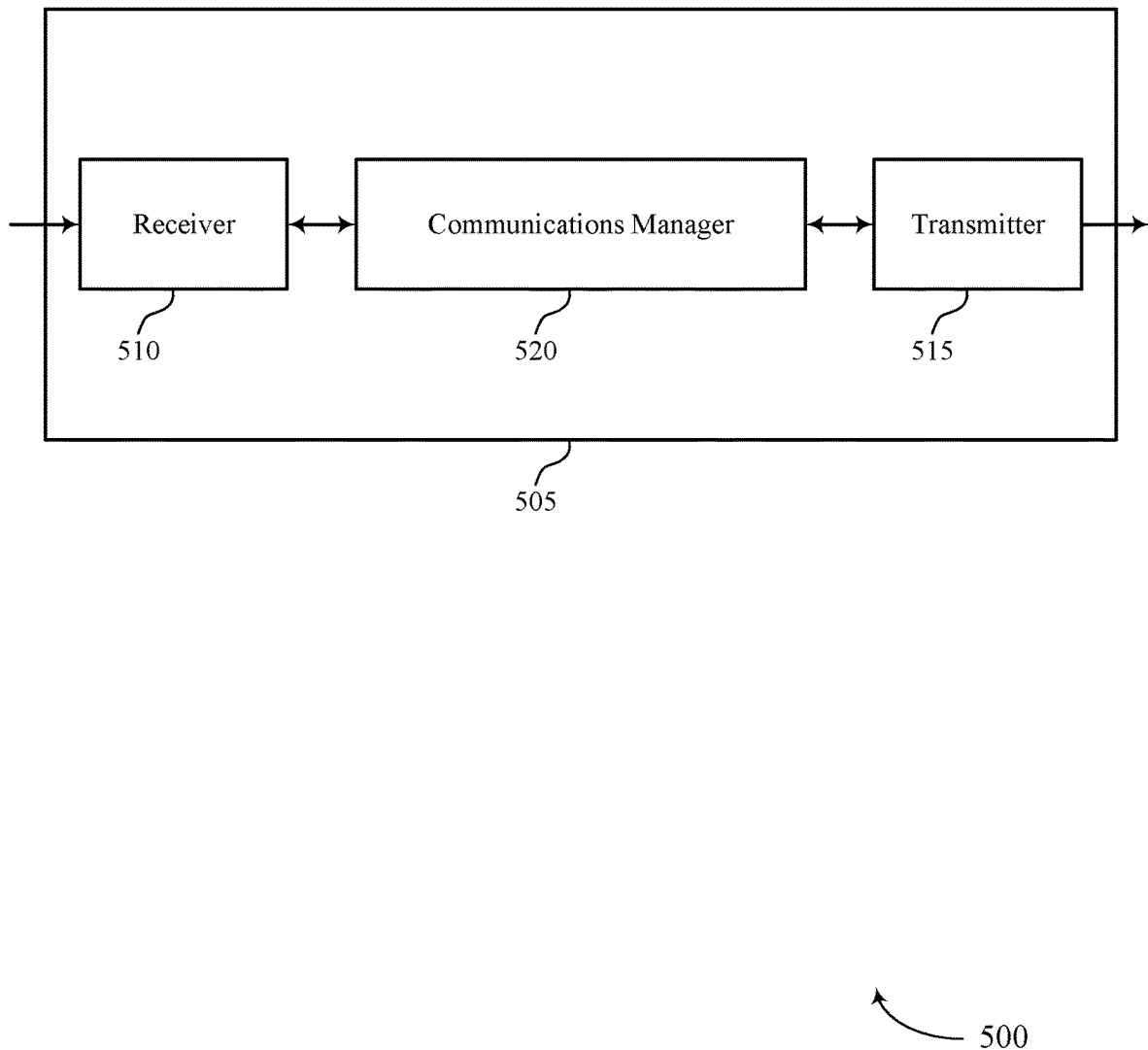
FIGS. 5 and 6 show block diagrams of devices that support maintaining configurations in conditional primary secondary cell group change in accordance with one or more aspects of the present disclosure.

FIG. 5 shows a block diagram 500 of a device 505 that supports maintaining configurations in conditional primary secondary cell group change in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to maintaining configurations in conditional primary secondary cell group change). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to maintaining configurations in conditional primary secondary cell group change). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of maintaining configurations in conditional primary secondary cell group change as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving signaling that indicates a set of multiple node configurations for a set of multiple target nodes. The communications manager 520 may be configured as or otherwise support a means for receiving a command to perform a node update procedure associated with the set of multiple node configurations. The communications manager 520 may be configured as or otherwise support a means for performing the node update procedure based on receiving the command. The communications manager 520 may be configured as or otherwise support a means for maintaining at least one of the set of multiple node configurations after performing the node update procedure. The communications manager 520 may be configured as or otherwise support a means for communicating based on results of the node update procedure.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for improvements in system efficiency such that a device may avoid sending a measurement report to the MN and waiting for a handover or CPAC command, making handover and CPAC more robust when cell conditions degrade in a relatively rapid fashion. Additionally, described techniques may result in reduced processing, reduced power consumption, more efficient utilization of communication resources.

Figure 6:
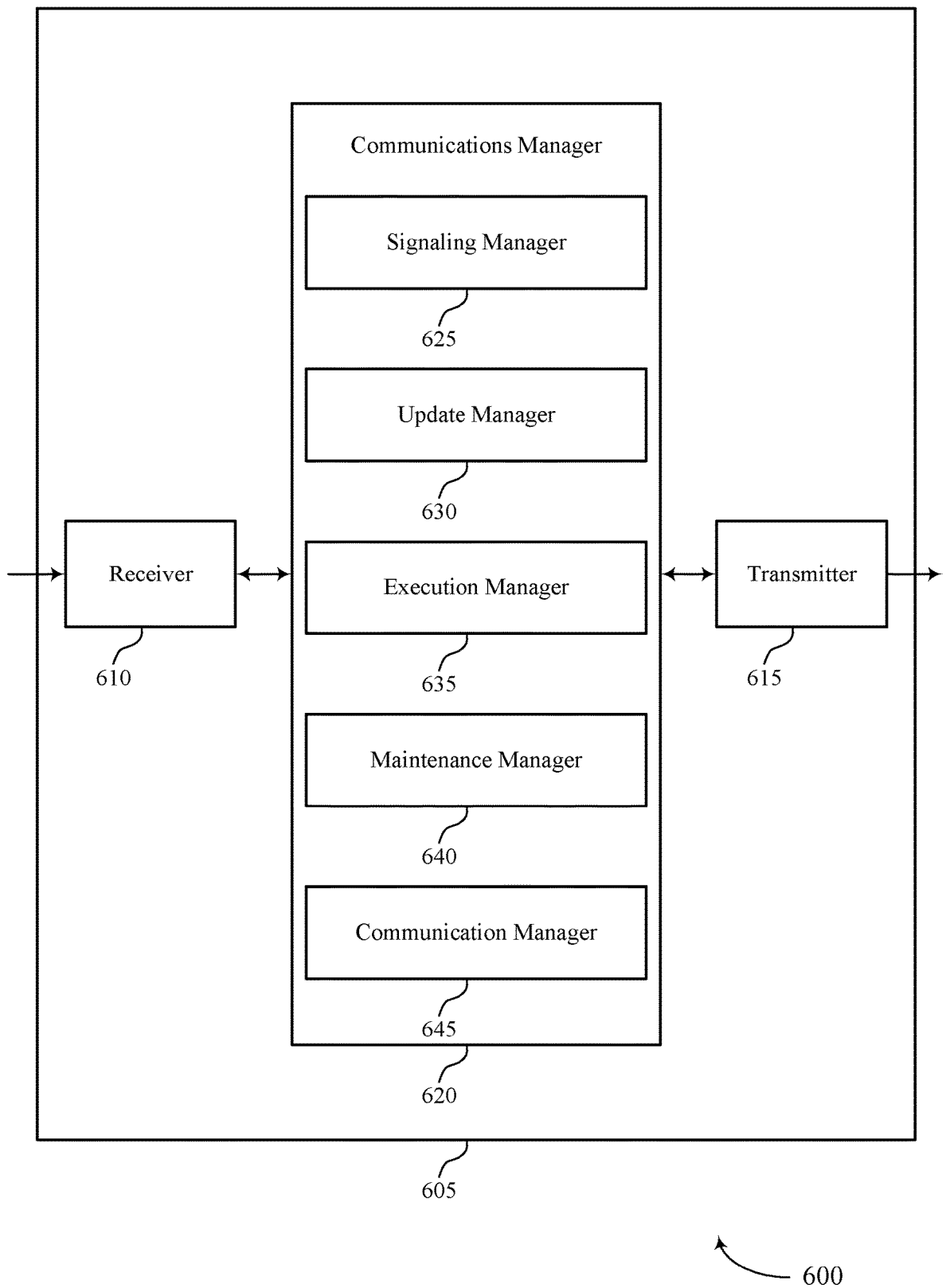

FIG. 6 shows a block diagram 600 of a device 605 that supports maintaining configurations in conditional primary secondary cell group change in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to maintaining configurations in conditional primary secondary cell group change). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to maintaining configurations in conditional primary secondary cell group change). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of maintaining configurations in conditional primary secondary cell group change as described herein. For example, the communications manager 620 may include a signaling manager 625, an update manager 630, an execution manager 635, a maintenance manager 640, a communication manager 645, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The signaling manager 625 may be configured as or otherwise support a means for receiving signaling that indicates a set of multiple node configurations for a set of multiple target nodes. The update manager 630 may be configured as or otherwise support a means for receiving a command to perform a node update procedure associated with the set of multiple node configurations. The execution manager 635 may be configured as or otherwise support a means for performing the node update procedure based on receiving the command. The maintenance manager 640 may be configured as or otherwise support a means for maintaining at least one of the set of multiple node configurations after performing the node update procedure. The communication manager 645 may be configured as or otherwise support a means for communicating based on results of the node update procedure.

Figure 7:
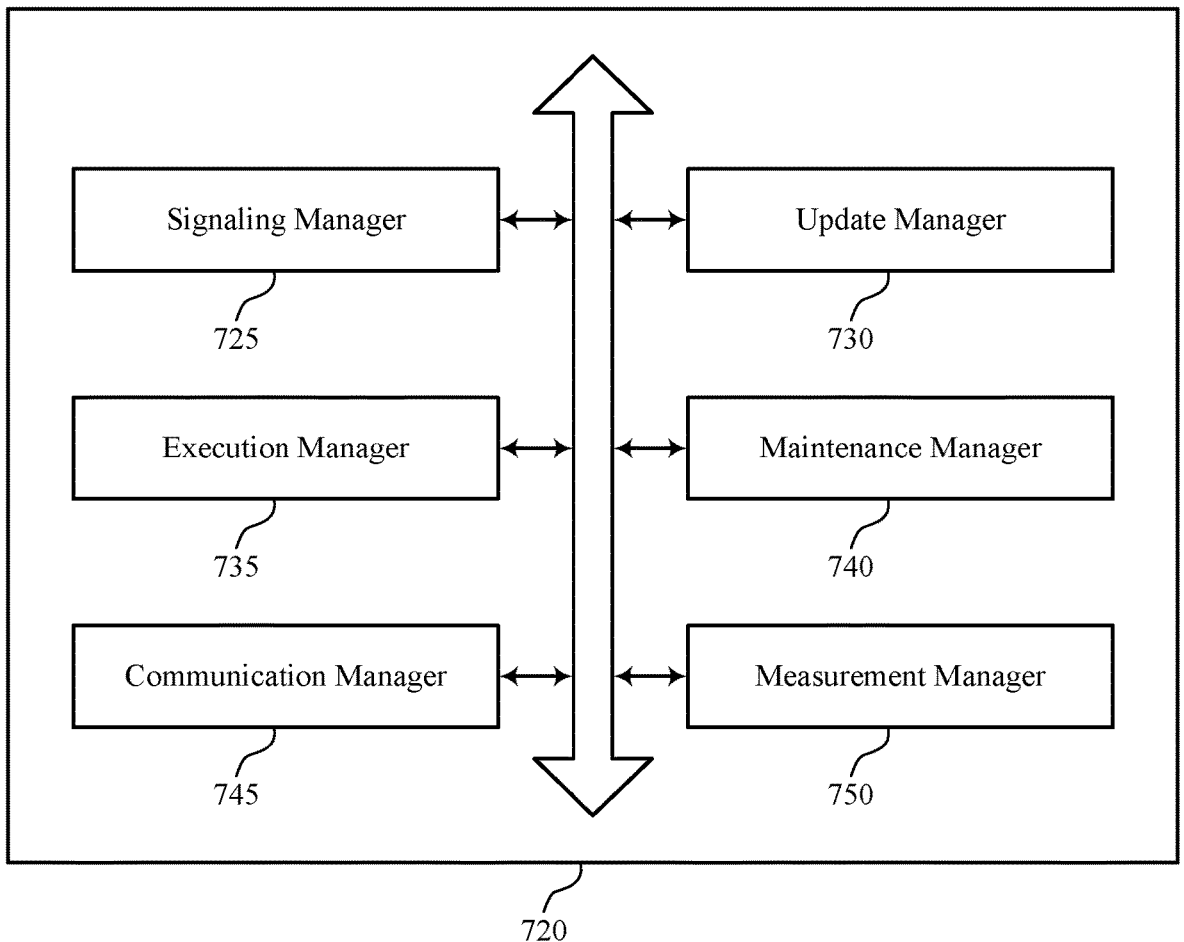
FIG. 7 shows a block diagram of a communications manager that supports maintaining configurations in conditional primary secondary cell group change in accordance with one or more aspects of the present disclosure.

FIG. 7 shows a block diagram 700 of a communications manager 720 that supports maintaining configurations in conditional primary secondary cell group change in accordance with one or more aspects of the present disclosure. The communications manager 720 may be an example of aspects of a communications manager 520, a communications manager 620, or both, as described herein. The communications manager 720, or various components thereof, may be an example of means for performing various aspects of maintaining configurations in conditional primary secondary cell group change as described herein. For example, the communications manager 720 may include a signaling manager 725, an update manager 730, an execution manager 735, a maintenance manager 740, a communication manager 745, a measurement manager 750, or any combination thereof. Each of these components may communicate, directly or indirectly, with one another (e.g., via one or more buses).

The communications manager 720 may support wireless communication at a UE in accordance with examples as disclosed herein. The signaling manager 725 may be configured as or otherwise support a means for receiving signaling that indicates a set of multiple node configurations for a set of multiple target nodes. The update manager 730 may be configured as or otherwise support a means for receiving a command to perform a node update procedure associated with the set of multiple node configurations. The execution manager 735 may be configured as or otherwise support a means for performing the node update procedure based on receiving the command. The maintenance manager 740 may be configured as or otherwise support a means for maintaining at least one of the set of multiple node configurations after performing the node update procedure. The communication manager 745 may be configured as or otherwise support a means for communicating based on results of the node update procedure.

In some examples, the measurement manager 750 may be configured as or otherwise support a means for transmitting cell measurements to a network entity based on the node configurations, where trigger conditions for cell measurements are omitted from the set of multiple node configurations, and where receiving the command to perform the node update procedure is based on transmitting the cell measurements.

In some examples, the update manager 730 may be configured as or otherwise support a means for receiving the command from a master node or a source secondary node. In some examples, the update manager 730 may be configured as or otherwise support a means for releasing one or more node configurations of the set of multiple node configurations based on a release indication included in the command.

In some examples, the update manager 730 may be configured as or otherwise support a means for receiving one or more node configurations in the command, the one or more node configurations including one or more of a new master node configuration, an update to an existing master node configuration, a new secondary node configuration, or an update to an existing secondary node configuration.

In some examples, the command is received via downlink control information, media access control control element, or radio resource control. In some examples, the command received via the downlink control information or the media access control control element includes a target cell group identifier associated with a master cell group or a secondary cell group.

In some examples, to support node update procedure, the update manager 730 may be configured as or otherwise support a means for changing from a source node to a target node, where the source node includes a source master node and the target node includes a target master node, or the source node includes a source secondary node and the target node includes a target secondary node, or both.

In some examples, to support node update procedure, the update manager 730 may be configured as or otherwise support a means for changing from a first cell to a second cell, where the first cell includes a source serving cell associated with a master cell group and the second cell includes a target cell associated with the master cell group, or the first cell includes a source serving cell associated with a secondary cell group and the second cell includes a target cell associated with the secondary cell group, or both.

In some examples, to support node update procedure, the update manager 730 may be configured as or otherwise support a means for adding a second link to a secondary node while maintaining a first link to a master node in accordance with a dual connectivity mode. In some examples, the set of multiple node configurations includes one or more of a target master node configuration, a source master node configuration, a target secondary node configuration, a source secondary node configuration, one or more candidate secondary node configurations, or an update to an existing node configuration. In some examples, the set of multiple node configurations are received in a radio resource control message.

Figure 8:
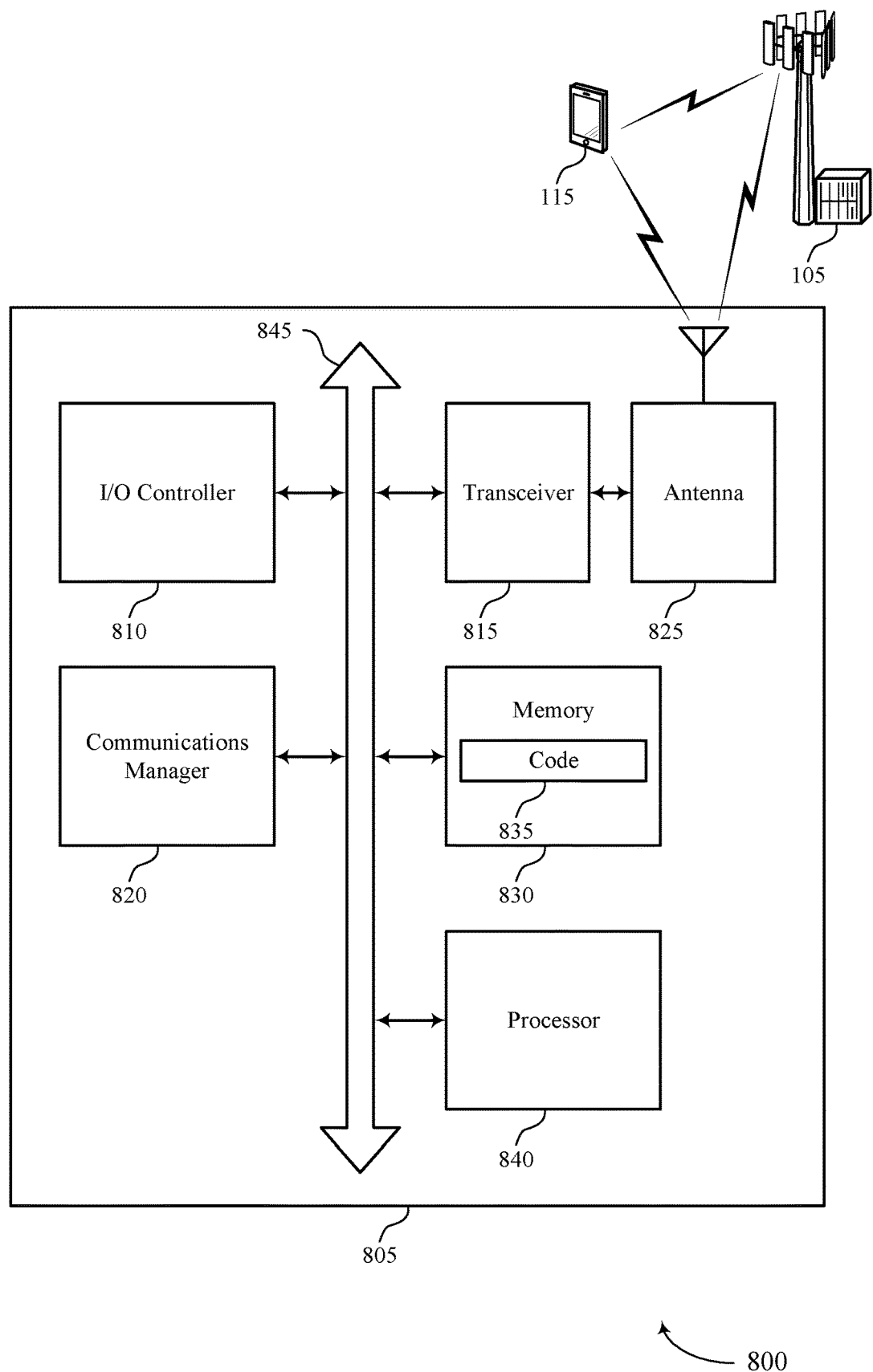
FIG. 8 shows a diagram of a system including a device that supports maintaining configurations in conditional primary secondary cell group change in accordance with one or more aspects of the present disclosure.

FIG. 8 shows a diagram of a system 800 including a device 805 that supports maintaining configurations in conditional primary secondary cell group change in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting maintaining configurations in conditional primary secondary cell group change). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving signaling that indicates a set of multiple node configurations for a set of multiple target nodes. The communications manager 820 may be configured as or otherwise support a means for receiving a command to perform a node update procedure associated with the set of multiple node configurations. The communications manager 820 may be configured as or otherwise support a means for performing the node update procedure based on receiving the command. The communications manager 820 may be configured as or otherwise support a means for maintaining at least one of the set of multiple node configurations after performing the node update procedure. The communications manager 820 may be configured as or otherwise support a means for communicating based on results of the node update procedure.

By including or configuring the communications manager 820 in accordance with examples as described herein, the device 805 may support techniques for improvements in system efficiency such that a device may avoid sending a measurement report to the MN and waiting for a handover or CPAC command, making handover and CPAC more robust when cell conditions degrade in a relatively rapid fashion. Additionally, described techniques may result in improved communication reliability, reduced latency, improved user experience related to reduced processing, reduced power consumption, more efficient utilization of communication resources, improved coordination between devices, longer battery life, improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of maintaining configurations in conditional primary secondary cell group change as described herein, or the processor 840 and the memory 830 may be otherwise configured to perform or support such operations.

Figure 9:
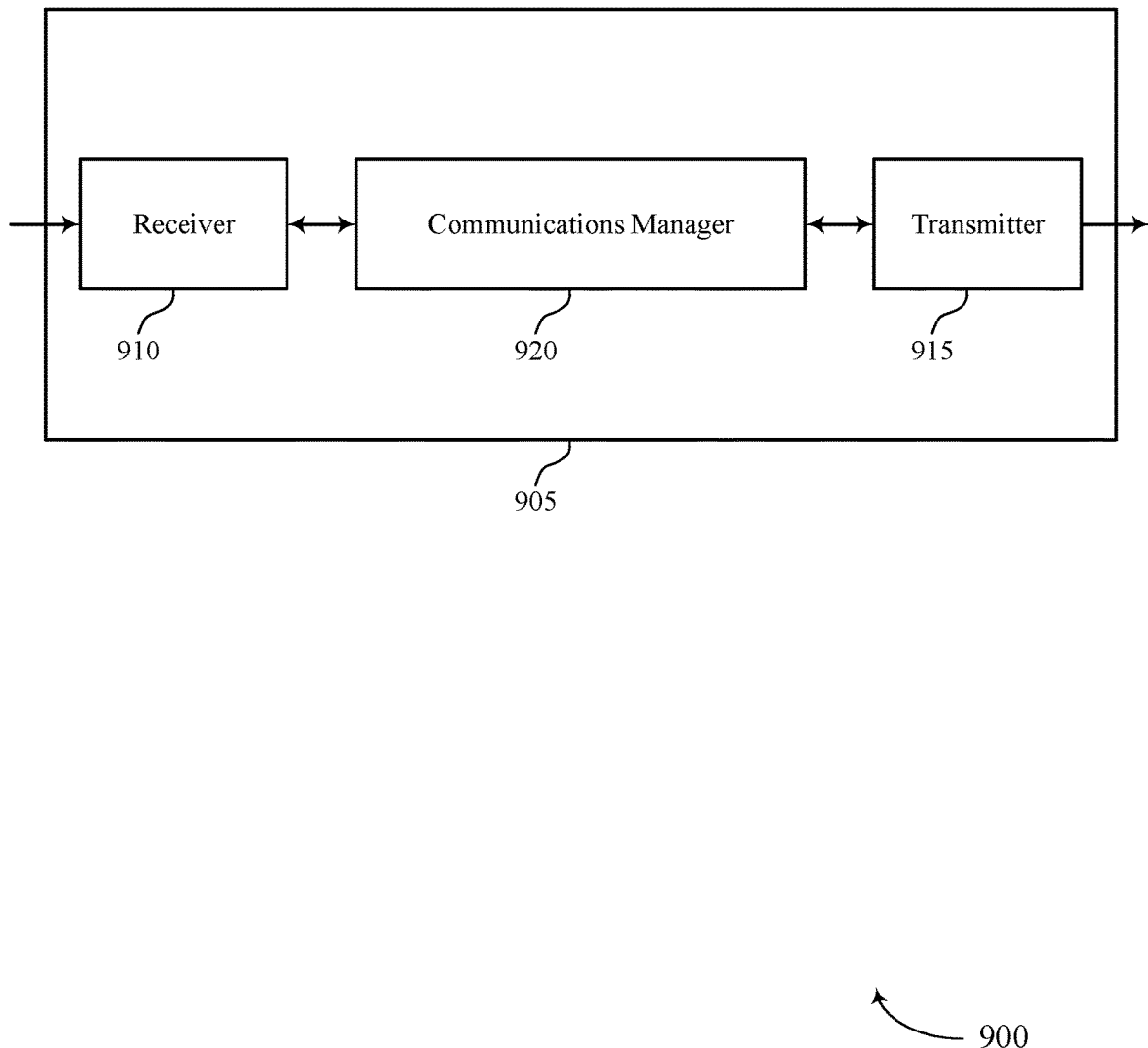
FIGS. 9 and 10 show block diagrams of devices that support maintaining configurations in conditional primary secondary cell group change in accordance with one or more aspects of the present disclosure.

FIG. 9 shows a block diagram 900 of a device 905 that supports maintaining configurations in conditional primary secondary cell group change in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of maintaining configurations in conditional primary secondary cell group change as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting signaling that indicates a set of multiple node configurations for a set of multiple target nodes. The communications manager 920 may be configured as or otherwise support a means for receiving one or more cell measurements based on the set of multiple node configurations. The communications manager 920 may be configured as or otherwise support a means for transmitting a command to initiate a node update procedure based on an analysis of the one or more cell measurements. The communications manager 920 may be configured as or otherwise support a means for communicating based on at least one of the set of multiple node configurations being maintained after the node update procedure.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for improvements in system efficiency such that a device may avoid sending a measurement report to the MN and waiting for a handover or CPAC command, making handover and CPAC more robust when cell conditions degrade in a relatively rapid fashion. Additionally, described techniques may result in reduced processing, reduced power consumption, more efficient utilization of communication resources.

Figure 10:
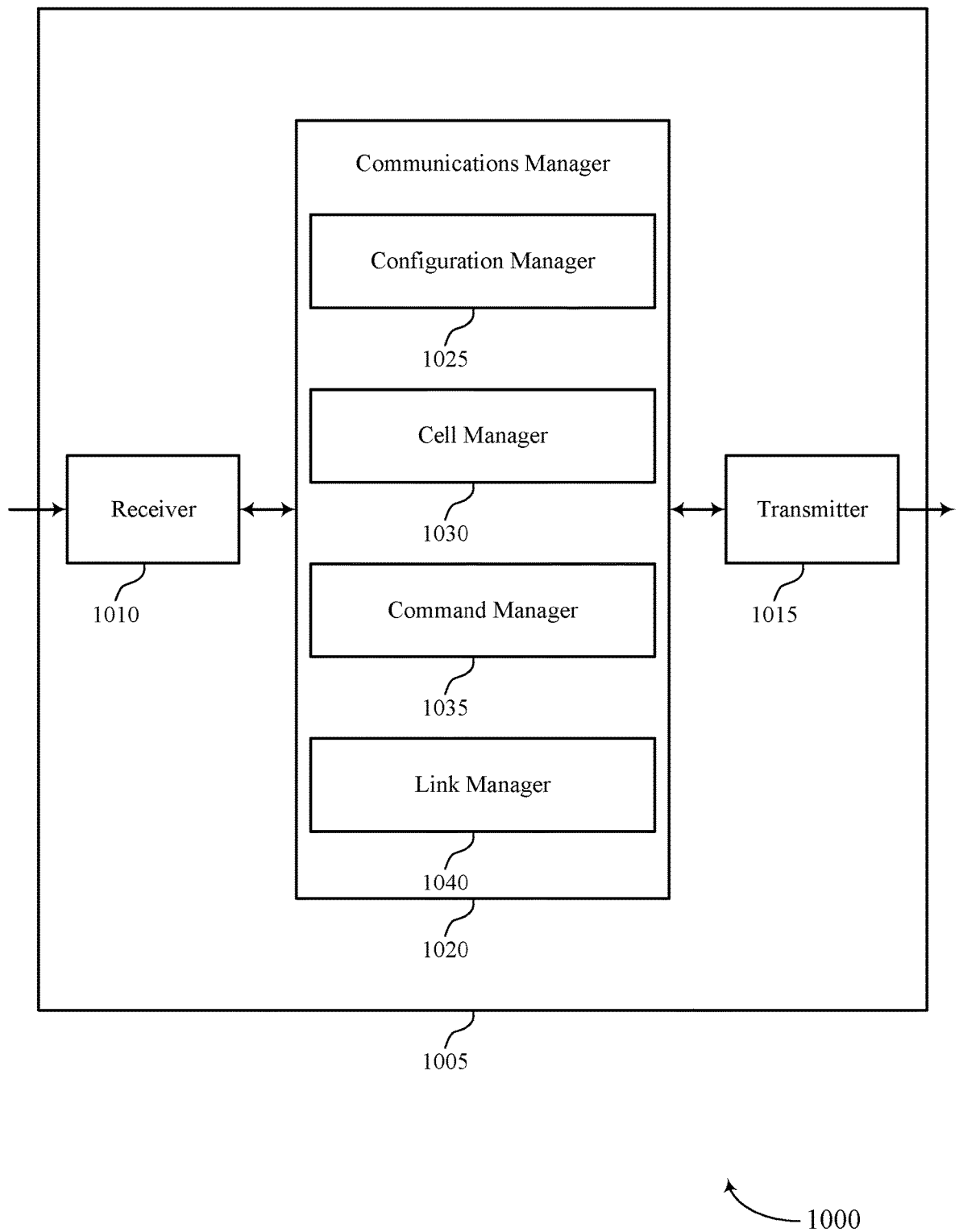

FIG. 10 shows a block diagram 1000 of a device 1005 that supports maintaining configurations in conditional primary secondary cell group change in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of maintaining configurations in conditional primary secondary cell group change as described herein. For example, the communications manager 1020 may include a configuration manager 1025, a cell manager 1030, a command manager 1035, a link manager 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The configuration manager 1025 may be configured as or otherwise support a means for transmitting signaling that indicates a set of multiple node configurations for a set of multiple target nodes. The cell manager 1030 may be configured as or otherwise support a means for receiving one or more cell measurements based on the set of multiple node configurations. The command manager 1035 may be configured as or otherwise support a means for transmitting a command to initiate a node update procedure based on an analysis of the one or more cell measurements. The link manager 1040 may be configured as or otherwise support a means for communicating based on at least one of the set of multiple node configurations being maintained after the node update procedure.

Figure 11:
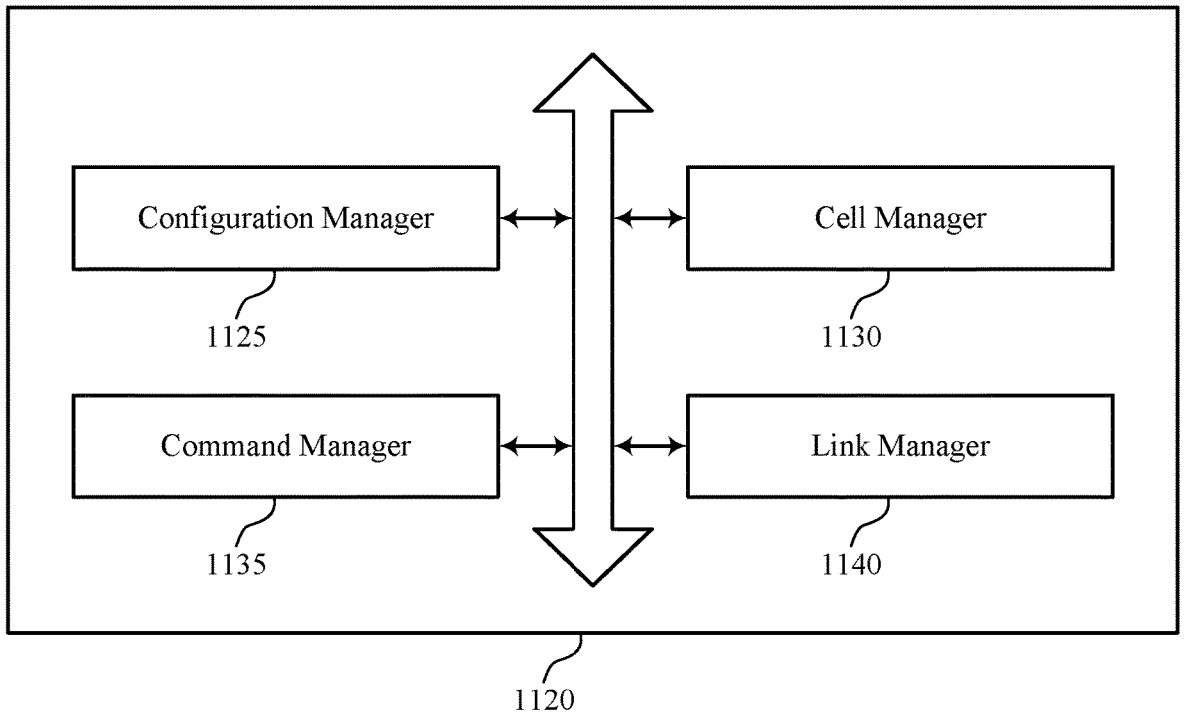
FIG. 11 shows a block diagram of a communications manager that supports maintaining configurations in conditional primary secondary cell group change in accordance with one or more aspects of the present disclosure.

FIG. 11 shows a block diagram 1100 of a communications manager 1120 that supports maintaining configurations in conditional primary secondary cell group change in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of maintaining configurations in conditional primary secondary cell group change as described herein. For example, the communications manager 1120 may include a configuration manager 1125, a cell manager 1130, a command manager 1135, a link manager 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The configuration manager 1125 may be configured as or otherwise support a means for transmitting signaling that indicates a set of multiple node configurations for a set of multiple target nodes. The cell manager 1130 may be configured as or otherwise support a means for receiving one or more cell measurements based on the set of multiple node configurations. The command manager 1135 may be configured as or otherwise support a means for transmitting a command to initiate a node update procedure based on an analysis of the one or more cell measurements. The link manager 1140 may be configured as or otherwise support a means for communicating based on at least one of the set of multiple node configurations being maintained after the node update procedure.

In some examples, the configuration manager 1125 may be configured as or otherwise support a means for omitting trigger conditions for cell measurements from the set of multiple node configurations.

In some examples, the command manager 1135 may be configured as or otherwise support a means for configuring the command to include a release indication to release one or more node configurations of the set of multiple node configurations based on the node update procedure. In some examples, the command manager 1135 may be configured as or otherwise support a means for configuring the command to include one or more node configurations, the one or more node configurations including one or more of a new master node configuration, an update to an existing master node configuration, a new secondary node configuration, or an update to an existing secondary node configuration.

In some examples, the command is transmitted via downlink control information, media access control control element, or radio resource control. In some examples, the command transmitted via the downlink control information or the media access control control element includes a target cell group identifier associated with a master cell group or a secondary cell group. In some examples, the command indicates changing from a source node to a target node, the source node includes a source master node and the target node includes a target master node, or the source node includes a source secondary node and the target node includes a target secondary node, or both.

In some examples, the command indicates changing from a first cell to a second cell. In some examples, the first cell includes a source serving cell associated with a master cell group and the second cell includes a target cell associated with the master cell group, or the first cell includes a source serving cell associated with a secondary cell group and the second cell includes a target cell associated with the secondary cell group, or both.

In some examples, the command manager 1135 may be configured as or otherwise support a means for configuring the command to indicate adding a second link to a secondary node while maintaining a first link to a master node in accordance with a dual connectivity mode.

In some examples, the set of multiple node configurations includes one or more of a target master node configuration, a source master node configuration, a target secondary node configuration, a source secondary node configuration, one or more candidate secondary node configurations, or an update to an existing node configuration. In some examples, the set of multiple node configurations are received in a radio resource control message. In some examples, the network entity is configured as a master node or a source secondary node.

Figure 12:
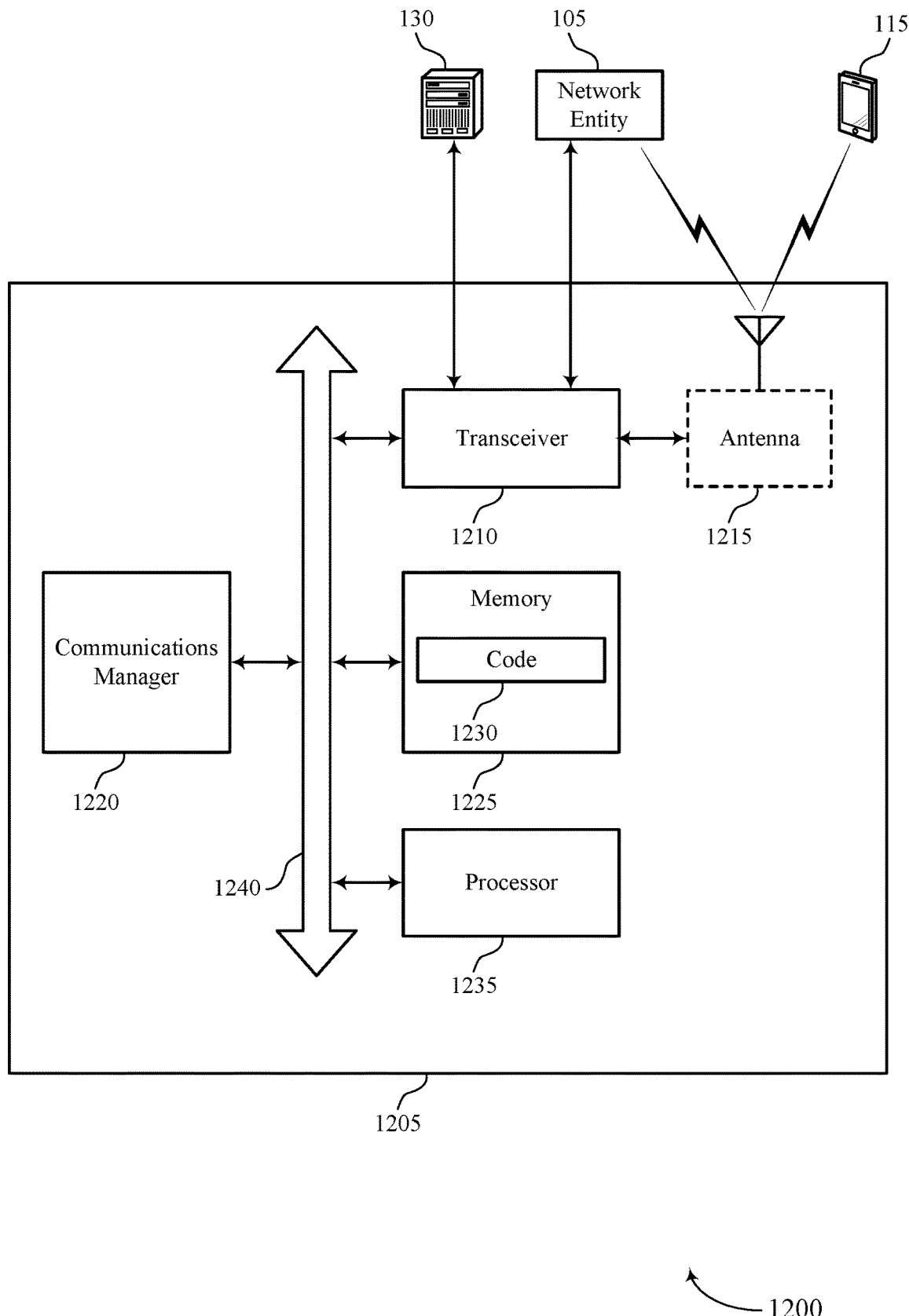
FIG. 12 shows a diagram of a system including a device that supports maintaining configurations in conditional primary secondary cell group change in accordance with one or more aspects of the present disclosure.

FIG. 12 shows a diagram of a system 1200 including a device 1205 that supports maintaining configurations in conditional primary secondary cell group change in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting maintaining configurations in conditional primary secondary cell group change). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting signaling that indicates a set of multiple node configurations for a set of multiple target nodes. The communications manager 1220 may be configured as or otherwise support a means for receiving one or more cell measurements based on the set of multiple node configurations. The communications manager 1220 may be configured as or otherwise support a means for transmitting a command to initiate a node update procedure based on an analysis of the one or more cell measurements. The communications manager 1220 may be configured as or otherwise support a means for communicating based on at least one of the set of multiple node configurations being maintained after the node update procedure.

By including or configuring the communications manager 1220 in accordance with examples as described herein, the device 1205 may support techniques for improvements in system efficiency such that a device may avoid sending a measurement report to the MN and waiting for a handover or CPAC command, making handover and CPAC more robust when cell conditions degrade in a relatively rapid fashion. Additionally, described techniques may result in improved communication reliability, reduced latency, improved user experience related to reduced processing, reduced power consumption, more efficient utilization of communication resources, improved coordination between devices, longer battery life, improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of maintaining configurations in conditional primary secondary cell group change as described herein, or the processor 1235 and the memory 1225 may be otherwise configured to perform or support such operations.

Figure 13:
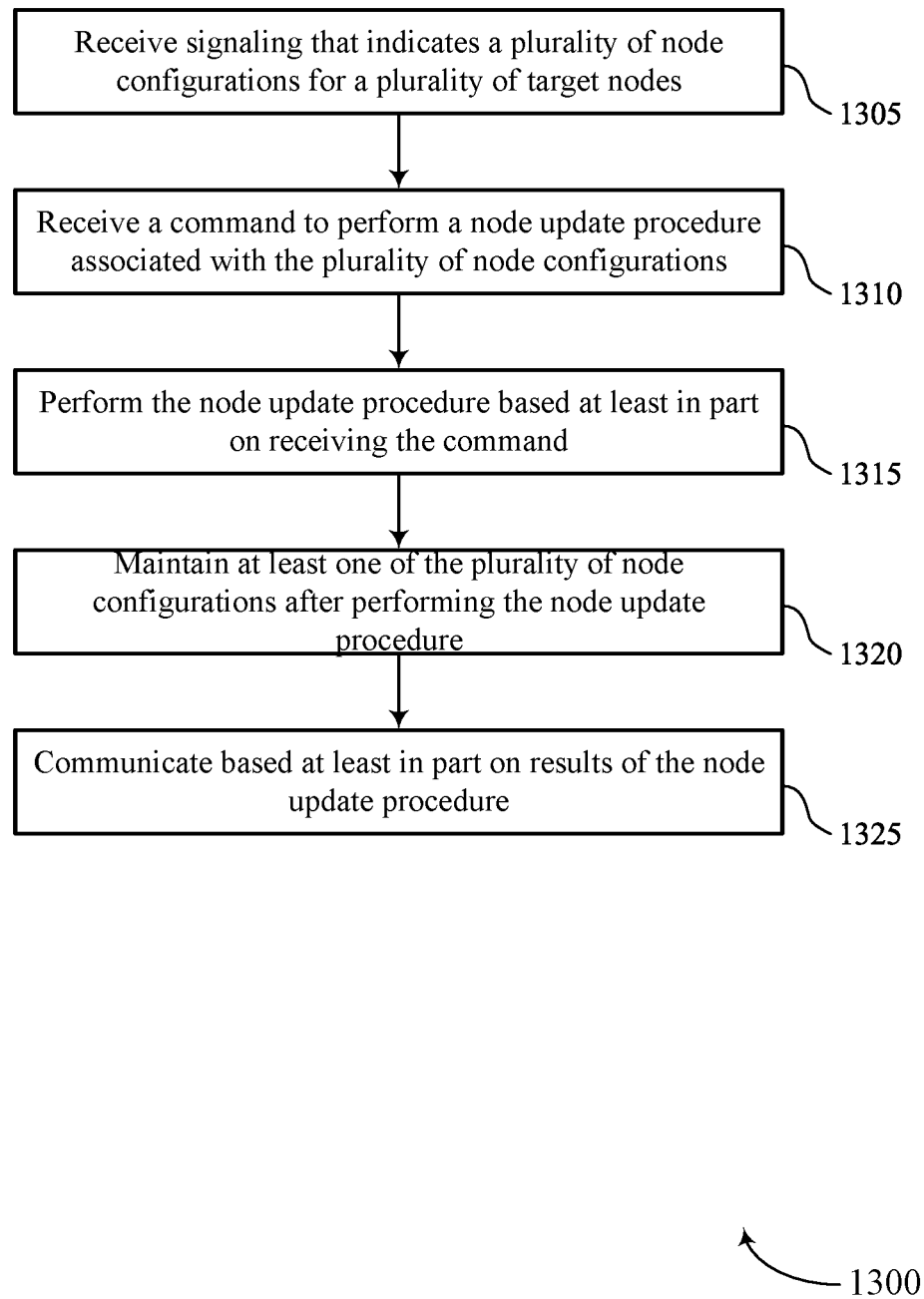
FIGS. 13 and 14 show flowcharts illustrating methods that support maintaining configurations in conditional primary secondary cell group change in accordance with one or more aspects of the present disclosure.

FIG. 13 shows a flowchart illustrating a method 1300 that supports maintaining configurations in conditional primary secondary cell group change in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving signaling that indicates a set of multiple node configurations for a set of multiple target nodes. The operations of 1305 may be performed in accordance with examples as disclosed herein. In some examples, aspects of the operations of 1305 may be performed by a signaling manager 725 as described with reference to FIG. 7.

At 1310, the method may include receiving a command to perform a node update procedure associated with the set of multiple node configurations. The operations of 1310 may be performed in accordance with examples as disclosed herein. In some examples, aspects of the operations of 1310 may be performed by an update manager 730 as described with reference to FIG. 7.

At 1315, the method may include performing the node update procedure based on receiving the command. The operations of 1315 may be performed in accordance with examples as disclosed herein. In some examples, aspects of the operations of 1315 may be performed by an execution manager 735 as described with reference to FIG. 7.

At 1320, the method may include maintaining at least one of the set of multiple node configurations after performing the node update procedure. The operations of 1320 may be performed in accordance with examples as disclosed herein. In some examples, aspects of the operations of 1320 may be performed by a maintenance manager 740 as described with reference to FIG. 7.

At 1325, the method may include communicating based on results of the node update procedure. The operations of 1325 may be performed in accordance with examples as disclosed herein. In some examples, aspects of the operations of 1325 may be performed by a communication manager 745 as described with reference to FIG. 7.

Figure 14:
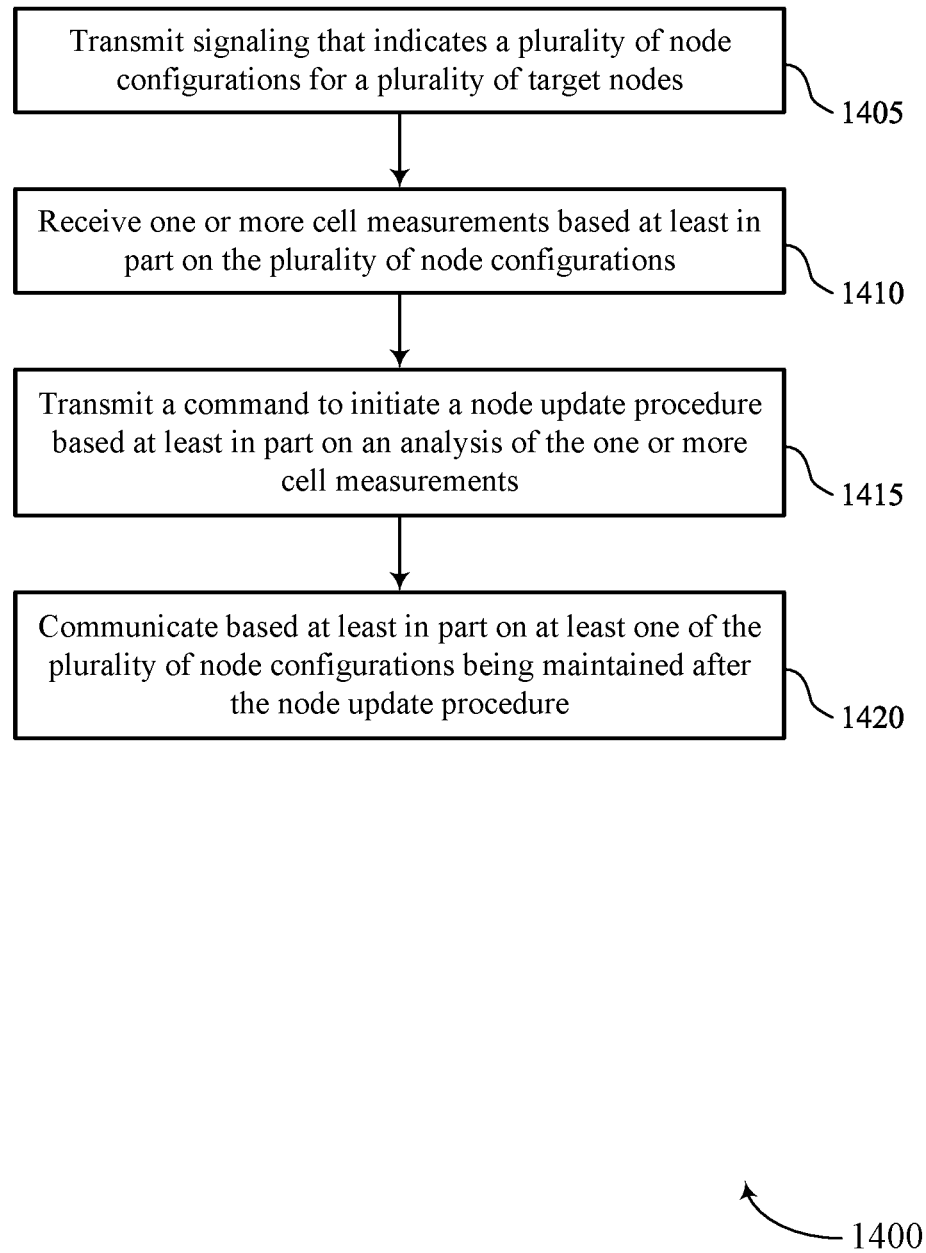

FIG. 14 shows a flowchart illustrating a method 1400 that supports maintaining configurations in conditional primary secondary cell group change in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting signaling that indicates a set of multiple node configurations for a set of multiple target nodes. The operations of 1405 may be performed in accordance with examples as disclosed herein. In some examples, aspects of the operations of 1405 may be performed by a configuration manager 1125 as described with reference to FIG. 11.

At 1410, the method may include receiving one or more cell measurements based on the set of multiple node configurations. The operations of 1410 may be performed in accordance with examples as disclosed herein. In some examples, aspects of the operations of 1410 may be performed by a cell manager 1130 as described with reference to FIG. 11.

At 1415, the method may include transmitting a command to initiate a node update procedure based on an analysis of the one or more cell measurements. The operations of 1415 may be performed in accordance with examples as disclosed herein. In some examples, aspects of the operations of 1415 may be performed by a command manager 1135 as described with reference to FIG. 11.

At 1420, the method may include communicating based on at least one of the set of multiple node configurations being maintained after the node update procedure. The operations of 1420 may be performed in accordance with examples as disclosed herein. In some examples, aspects of the operations of 1420 may be performed by a link manager 1140 as described with reference to FIG. 11.

The following provides an overview of aspects of the present disclosure:

Aspect 1: A method for wireless communication at a UE, comprising: receiving signaling that indicates a plurality of node configurations for a plurality of target nodes; receiving a command to perform a node update procedure associated with the plurality of node configurations; performing the node update procedure based at least in part on receiving the command; maintaining at least one of the plurality of node configurations after performing the node update procedure; and communicating based at least in part on results of the node update procedure.

Aspect 2: The method of aspect 1, further comprising: transmitting cell measurements to a network entity based at least in part on the node configurations, wherein trigger conditions for cell measurements are omitted from the plurality of node configurations, and wherein receiving the command to perform the node update procedure is based at least in part on transmitting the cell measurements.

Aspect 3: The method of any of aspects 1 through 2, further comprising: receiving the command from a master node or a source secondary node.

Aspect 4: The method of any of aspects 1 through 3, further comprising: releasing one or more node configurations of the plurality of node configurations based at least in part on a release indication included in the command.

Aspect 5: The method of any of aspects 1 through 4, further comprising: receiving one or more node configurations in the command, the one or more node configurations comprising one or more of a new master node configuration, an update to an existing master node configuration, a new secondary node configuration, or an update to an existing secondary node configuration.

Aspect 6: The method of any of aspects 1 through 5, wherein the command is received via downlink control information, media access control control element, or radio resource control, wherein the command received via the downlink control information or the media access control control element comprises a target cell group identifier associated with a master cell group or a secondary cell group.

Aspect 7: The method of any of aspects 1 through 6, wherein the node update procedure comprises: changing from a source node to a target node, wherein the source node includes a source master node and the target node includes a target master node, or the source node includes a source secondary node and the target node includes a target secondary node, or both.

Aspect 8: The method of any of aspects 1 through 7, wherein the node update procedure comprises: changing from a first cell to a second cell, wherein the first cell includes a source serving cell associated with a master cell group and the second cell includes a target cell associated with the master cell group, or the first cell includes a source serving cell associated with a secondary cell group and the second cell includes a target cell associated with the secondary cell group, or both.

Aspect 9: The method of any of aspects 1 through 8, wherein the node update procedure comprises: adding a second link to a secondary node while maintaining a first link to a master node in accordance with a dual connectivity mode.

Aspect 10: The method of any of aspects 1 through 9, wherein the plurality of node configurations comprises one or more of a target master node configuration, a source master node configuration, a target secondary node configuration, a source secondary node configuration, one or more candidate secondary node configurations, or an update to an existing node configuration.

Aspect 11: The method of any of aspects 1 through 10, wherein the plurality of node configurations are received in a radio resource control message.

Aspect 12: A method for wireless communication at a network entity, further comprising: transmitting signaling that indicates a plurality of node configurations for a plurality of target nodes; receiving one or more cell measurements based at least in part on the plurality of node configurations; transmitting a command to initiate a node update procedure based at least in part on an analysis of the one or more cell measurements; and communicating based at least in part on at least one of the plurality of node configurations being maintained after the node update procedure.

Aspect 13: The method of aspect 12, further comprising: omitting trigger conditions for cell measurements from the plurality of node configurations.

Aspect 14: The method of any of aspects 12 through 13, further comprising: configuring the command to include a release indication to release one or more node configurations of the plurality of node configurations based at least in part on the node update procedure.

Aspect 15: The method of any of aspects 12 through 14, further comprising: configuring the command to include one or more node configurations, the one or more node configurations comprising one or more of a new master node configuration, an update to an existing master node configuration, a new secondary node configuration, or an update to an existing secondary node configuration.

Aspect 16: The method of any of aspects 12 through 15, wherein the command is transmitted via downlink control information, media access control control element, or radio resource control, wherein the command transmitted via the downlink control information or the media access control control element comprises a target cell group identifier associated with a master cell group or a secondary cell group.

Aspect 17: The method of any of aspects 12 through 16, wherein the command indicates changing from a source node to a target node, the source node comprises a source master node and the target node comprises a target master node, or the source node comprises a source secondary node and the target node comprises a target secondary node, or both.

Aspect 18: The method of any of aspects 12 through 17, wherein the command indicates changing from a first cell to a second cell, the first cell includes a source serving cell associated with a master cell group and the second cell includes a target serving cell associated with the master cell group, or the first cell includes a source serving cell associated with a secondary cell group and the second cell includes a target serving cell associated with the secondary cell group, or both.

Aspect 19: The method of any of aspects 12 through 18, further comprising: configuring the command to indicate adding a second link to a secondary node while maintaining a first link to a master node in accordance with a dual connectivity mode.

Aspect 20: The method of any of aspects 12 through 19, wherein the plurality of node configurations comprises one or more of a target master node configuration, a source master node configuration, a target secondary node configuration, a source secondary node configuration, one or more candidate secondary node configurations, or an update to an existing node configuration.

Aspect 21: The method of any of aspects 12 through 20, wherein the plurality of node configurations are received in a radio resource control message.

Aspect 22: The method of any of aspects 12 through 21, wherein the network entity is configured as a master node or a source secondary node.

Aspect 23: An apparatus for wireless communication at a UE, comprising a processor; memory coupled with the processor; and instructions stored in the memory and executable by the processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a network entity, comprising a processor; memory coupled with the processor; and instructions stored in the memory and executable by the processor to cause the apparatus to perform a method of any of aspects 12 through 22.

Aspect 27: An apparatus for wireless communication at a network entity, comprising at least one means for performing a method of any of aspects 12 through 22.

Aspect 28: A non-transitory computer-readable medium storing code for wireless communication at a network entity, the code comprising instructions executable by a processor to perform a method of any of aspects 12 through 22.

Examples of these aspects may be combined with aspects or embodiments disclosed in other implementations.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
one or more memories storing processor-executable code; and
one or more processors coupled with the one or more memories and individually or collectively operable to cause the UE to:
receive signaling that indicates a plurality of node configurations for a plurality of target nodes;
obtain one or more cell measurements for one or more of the plurality of target nodes, wherein the one or more cell measurements are obtained in an absence of trigger conditions in the plurality of node configurations for measurement and reporting associated with a node update procedure;
transmit the one or more cell measurements to a network entity, in the absence of the trigger conditions, based at least in part on the plurality of node configurations;
receive a command to perform the node update procedure associated with the plurality of node configurations based at least in part on the one or more cell measurements;
perform the node update procedure based at least in part on receiving the command;
maintain at least one of the plurality of node configurations after performing the node update procedure; and
communicate based at least in part on results of the node update procedure.

2. The UE of claim 1, wherein the one or more processors are individually or collectively further operable to execute the code to cause the UE to:
receive the command from a master node or a source secondary node.

3. The UE of claim 1, wherein the one or more processors are individually or collectively further operable to execute the code to cause the UE to:
release one or more node configurations of the plurality of node configurations based at least in part on a release indication included in the command.

4. The UE of claim 1, wherein the one or more processors are individually or collectively further operable to execute the code to cause the UE to:
receive one or more node configurations in the command, the one or more node configurations comprising one or more of a new master node configuration, an update to an existing master node configuration, a new secondary node configuration, or an update to an existing secondary node configuration.

5. The UE of claim 1, wherein:
the command is received via downlink control information, media access control control element, or radio resource control, wherein:
the command received via the downlink control information or the media access control control element comprises a target cell group identifier associated with a master cell group or a secondary cell group.

6. The UE of claim 1, wherein, to perform the node update procedure, the one or more processors are individually or collectively operable to execute the code to cause the UE to:
change from a source node to a target node, wherein the source node includes a source master node and the target node includes a target master node, or the source node includes a source secondary node and the target node includes a target secondary node, or both.

7. The UE of claim 1, wherein, to perform the node update procedure, the one or more processors are individually or collectively operable to execute the code to cause the UE to:
change from a first cell to a second cell, wherein the first cell includes a source serving cell associated with a master cell group and the second cell includes a target cell associated with the master cell group, or the first cell includes a source serving cell associated with a secondary cell group and the second cell includes a target cell associated with the secondary cell group, or both.

8. The UE of claim 1, wherein, to perform the node update procedure, the one or more processors are individually or collectively operable to execute the code to cause the UE to:
add a second link to a secondary node while maintaining a first link to a master node in accordance with a dual connectivity mode.

9. The UE of claim 1, wherein the plurality of node configurations comprises one or more of a target master node configuration, a source master node configuration, a target secondary node configuration, a source secondary node configuration, one or more candidate secondary node configurations, or an update to an existing node configuration.

10. The UE of claim 1, wherein the plurality of node configurations are received in a radio resource control message.

11. A network entity for wireless communication, comprising:
one or more memories storing processor-executable code; and
one or more processors coupled with the one or more memories and individually or collectively operable to cause the network entity to:
transmit signaling that indicates a plurality of node configurations for a plurality of target nodes;
receive one or more cell measurements for one or more of the plurality of target nodes based at least in part on the plurality of node configurations, wherein the plurality of node configurations do not include trigger conditions for measurement and reporting associated with a node update procedure;
transmit a command to initiate the node update procedure based at least in part on an analysis of the one or more cell measurements; and
communicate based at least in part on at least one of the plurality of node configurations being maintained after the node update procedure.

12. The network entity of claim 11, wherein the one or more processors are individually or collectively further operable to execute the code to cause the network entity to:
configure the command to include a release indication to release one or more node configurations of the plurality of node configurations based at least in part on the node update procedure.

13. The network entity of claim 11, wherein the one or more processors are individually or collectively further operable to execute the code to cause the network entity to:
configure the command to include one or more node configurations, the one or more node configurations comprising one or more of a new master node configuration, an update to an existing master node configuration, a new secondary node configuration, or an update to an existing secondary node configuration.

14. The network entity of claim 11, wherein:
the command is transmitted via downlink control information, media access control control element, or radio resource control, wherein:
the command transmitted via the downlink control information or the media access control control element comprises a target cell group identifier associated with a master cell group or a secondary cell group.

15. The network entity of claim 11, wherein the command indicates changing from a source node to a target node, the source node comprises a source master node and the target node comprises a target master node, or the source node comprises a source secondary node and the target node comprises a target secondary node, or both.

16. The network entity of claim 11, wherein:
the command indicates changing from a first cell to a second cell, and
the first cell includes a source serving cell associated with a master cell group and the second cell includes a target cell associated with the master cell group, or the first cell includes a source serving cell associated with a secondary cell group and the second cell includes a target cell associated with the secondary cell group, or both.

17. The network entity of claim 11, wherein the one or more processors are individually or collectively further operable to execute the code to cause the network entity to:
configure the command to indicate adding a second link to a secondary node while maintaining a first link to a master node in accordance with a dual connectivity mode.

18. The network entity of claim 11, wherein the plurality of node configurations comprises one or more of a target master node configuration, a source master node configuration, a target secondary node configuration, a source secondary node configuration, one or more candidate secondary node configurations, or an update to an existing node configuration.

19. The network entity of claim 11, wherein the plurality of node configurations are received in a radio resource control message.

20. The network entity of claim 11, wherein the network entity is configured as a master node or a source secondary node.

21. A method for wireless communication at a user equipment (UE), comprising:
receiving signaling that indicates a plurality of node configurations for a plurality of target nodes;
obtaining one or more cell measurements for one or more of the plurality of target nodes, wherein the one or more cell measurements are obtained in an absence of trigger conditions in the plurality of node configurations for measurement and reporting associated with a node update procedure;
transmitting the one or more cell measurements to a network entity, in the absence of the trigger conditions, based at least in part on the plurality of node configurations;
receiving a command to perform the node update procedure associated with the plurality of node configurations based at least in part on the one or more cell measurements;
performing the node update procedure based at least in part on receiving the command;
maintaining at least one of the plurality of node configurations after performing the node update procedure; and
communicating based at least in part on results of the node update procedure.

22. The method of claim 21, further comprising:
receiving the command from a master node or a source secondary node.

23. The method of claim 21, further comprising:
releasing one or more node configurations of the plurality of node configurations based at least in part on a release indication included in the command.

24. A method for wireless communication at a network entity, further comprising:
transmitting signaling that indicates a plurality of node configurations for a plurality of target nodes;
receiving one or more cell measurements for one or more of the plurality of target nodes based at least in part on the plurality of node configurations, wherein the plurality of node configurations do not include trigger conditions for measurement and reporting associated with a node update procedure;
transmitting a command to initiate the node update procedure based at least in part on an analysis of the one or more cell measurements; and
communicating based at least in part on at least one of the plurality of node configurations being maintained after the node update procedure.

25. The method of claim 24, further comprising:
configuring the command to include a release indication to release one or more node configurations of the plurality of node configurations based at least in part on the node update procedure.

26. The method of claim 24, further comprising:
configuring the command to include one or more node configurations, the one or more node configurations comprising one or more of a new master node configuration, an update to an existing master node configuration, a new secondary node configuration, or an update to an existing secondary node configuration.

\* \* \* \* \*